United States Patent Office

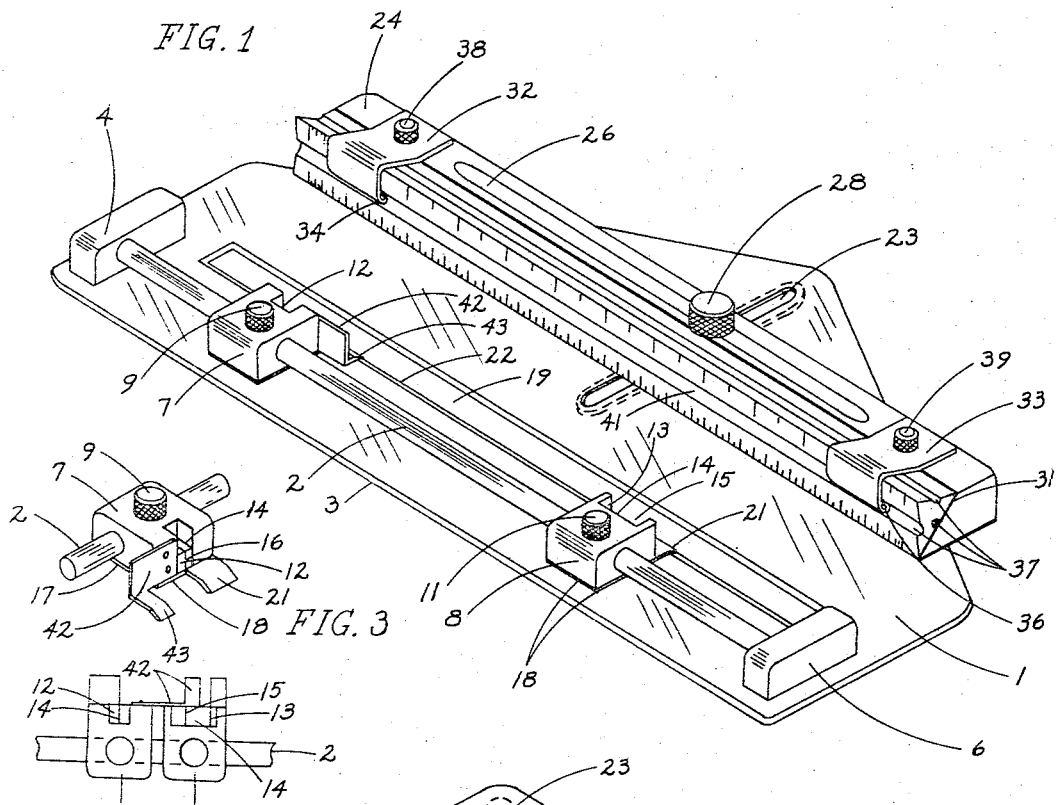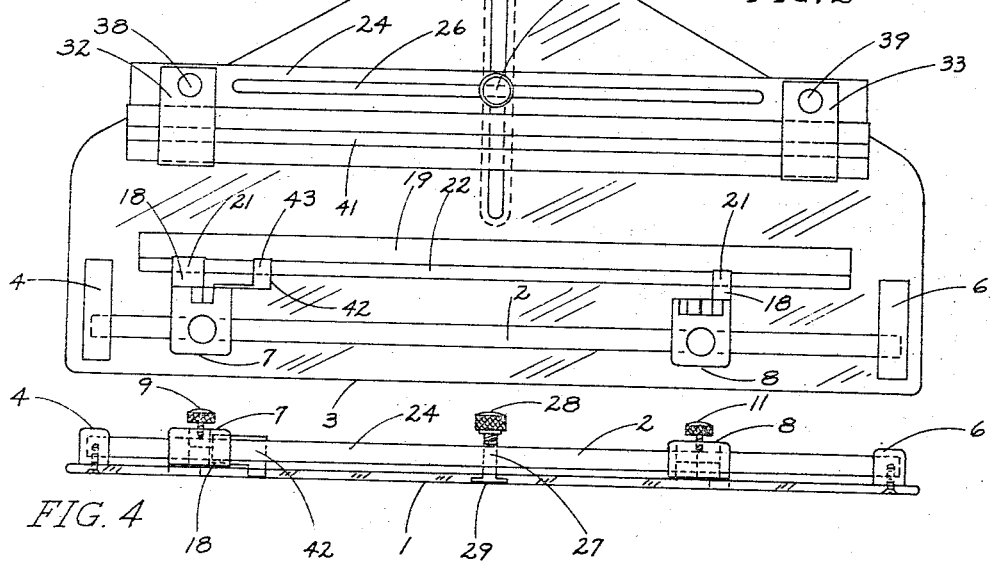

3,330,042
Patented July 11, 1967

3,330,042
SCALING DEVICES
Robert E. Frederick, 9505 Hale Place,
Silver Spring, Md. 20910
Filed Oct. 15, 1965, Ser. No. 496,485
8 Claims. (Cl. 33—107)

The present invention relates to scaling devices and, more particularly, to an apparatus for converting a scale, such as an architect's or engineer's scale which does not conform to the scale of a drawing, to the scale of the drawing so that all subsequent measurements may be made directly on the architect's or engineer's scale in terms of the scale of the drawing.

It is often found in the field of drafting that the scale of a reproduction of a particular drawing from which measurements are to be taken does not conform to conventional scales found on the usual triangular architect's or engineer's scale, and thus, every measurement made must be converted to the scale of the drawing so as to obtain actual measurements. This process is usually referred to as applying a "scaling factor" to the measurements.

The apparatus of the present invention provides a simple mechanism by which the scale on conventional architect's, engineer's or other available scaling or measuring device may be readily converted to the scale of a drawing so that, after conversion, all measurements may be made directly in terms of the scale of the drawing. It should be pointed out that, in many instances, the actual scale of a drawing is not known, but the length of a single line on the drawing may be accurately known. By means of the present invention, the length of a given line whose length is known, may be expressed in terms of a scale on the architect's or engineer's scale, etc. and then all subsequent measurements may be read from the architect's scale in terms of the actual scale of the drawing, even though the scale of the drawing may not be known.

The apparatus of the present invention comprises two members secured to a base member for movement parallel to one edge of the base member. An architect's scale is secured to a scale carriage adapted to be rotated about an axis perpendicular to the base member so as to change the angle between the scale and the line whose length is known. The scale carriage may also be moved rectilinearly in a plane parallel to the plane of the base member. Viewing devices are provided on each of the slidable members so that marks or indicia on the scale may be aligned with the sliding members. In use, the sliding members are aligned with the two ends of a line and the scale is positioned, for instance, with the zero indicia aligned with one of the slidable members and the scale carriage then rotated until a suitable indicia becomes aligned with the other slidable member.

The apparatus is now calibrated to the scale of the drawing, whether known or not, and the length of any line can then be measured in terms of the distance between indicia on the scale. Specifically, lines may be measured by moving the slidable members to conform to the length of the line to be measured and then noting the indicia on the scale which are opposite the slidable members. Thus, all measurements may be made in terms of the basic scale which by appropriate initial angular positioning relative to the slidable members, or more particularly, the original line which has been measured, is converted to a scale appropriate for the drawing.

Another use for the apparatus of the present invention is, for instance, in the photographic arts, particularly in composing printed publications. In composing publications, pictures or other illustrative material to be incorporated therein are rarely of the same size as the space allotted thereto in the publication. The material must therefore be expanded or contracted photographically to fit the available space and in these arts, reductions and expansions are usually expressed in terms of percentages; that is, a 35 percent reduction or a 35 percent increase in length or width. If a scale, which is calibrated from 0 to 100 is employed with the apparatus of the present invention, percentage reduction may be read directly from the scale. More particularly, initially the slidable members are positioned a distance apart equal to the initial, for instance, width of the picture. The scale is then rotated until the 0 and 100 calibrations are positioned opposite the slidable members, or more particularly, the aligning indicia on the slidable members. A first slidable member, the one initially aligned with the 100 indicia on the scale, is then moved toward or away from, as the case may be, the other slidable member until the desired dimension for the picture is acquired. The scale may then be viewed through the first slidable member and the scale reading indicates directly the percentage reduction or increase in the size of the picture.

It is an object of the present invention to provide a scaling device in which a conventional scale may be converted to the scale of a drawing, whether such scale is known or not, and thereafter all measurements made from the drawing may be read directly from the scale in terms of the actual scale of the drawing.

It is another object of the present invention to provide a scaling device for converting a standard scale to a non-standard scale, which apparatus is simple and economical of manufacture.

It is still another object of the present invention to provide a scaling device in which the percent reduction or expansion of a picture or similar illustrative material may be readily determined.

It is yet another object of the present invention to provide a simple and economical scaling device which may be employed for a converting a conventional scale to a non-standard or unconventional scale or for determining percentage reduction or increase in size of illustrative material in the printing industry, or which may be employed for related purposes.

The above and still further objects, features and advantages of the present invention will become apparent upon consideration of the following detailed description of one specific embodiment thereof, especially when taken in conjunction with the accompanying drawings, wherein:

FIGURE 1 is a view in perspective of the apparatus of the present invention;

FIGURE 2 is a top view of the apparatus of the present invention;

FIGURE 3 is a view in perspective of one of the slidable members employed in the apparatus;

FIGURE 4 is a front view in elevation of the apparatus of the invention; and

FIGURE 5 is a top view of the slidable members when employed for measuring short lines.

Referring specifically to FIGURES 1, 2 and 4 of the accompanying drawings, there is provided a base member 1 having a generally circular rod 2 secured to the base member and arranged generally parallel to an edge 3 thereof. The bar 2 is secured to the base member 1 by the means of two end supports 4 and 6 which may be suitably secured to the base member. The bar 2 passes through two slidable members 7 and 8 so that the members may slide along the bar 2 parallel to the edge 3. Thumb screws 9 and 11 are provided for locking the members 7 and 8 in a particular position on the bar 2.

Each of the members 7 and 8 carries a prism 12 and 13, respectively, which prisms are triangular in shape. A first leg of each of the triangular-shaped prisms lies in a plane perpendicular to the base member 1 facing away from the edge 3. A second leg of each of the triangular prisms is arranged parallel to the base member, whereas the hypotenuse of the triangle is situated in the members 7 and 8 and cannot be seen. The prism 13 may extend across the front of a large portion of the member 8 for purposes to be explained subsequently. Each prism is provided with two hairlines, a hairline 14 being formed in the viewing area of the upper surface of the prism and a hairline 16 formed in optical relationship to hairline 14 on the vertical face thereof. The prism 13 is provided with an additional set of hairlines 15, adjacent the right edge thereof also for purposes to be described subsequently.

The slidable members 7 and 8 each carry a base plate 17 which engages the base plate 1 to prevent wobble of the members, i.e. rotation about shaft 2. The plates 17 have an extension 18 extending to the edge of a slot 19 formed in the base member 1 parallel to the edge 3 and thus parallel to the bar 2. The right edge, as viewed in FIGURES 1 and 2, of the plate 18 associated with the member 7 and the left edge of the plate 18 associated with the member 8 are in exact alignment with hairlines 16 of the associated prism. The forward portion 21 of the member 18 slopes downwardly so that the plate conforms to a sloping surface 22 defining one boundary of the slot 19. The surface 22 is sloped so as to provide a knife edge along the edge of the slot 19 to facilitate alignment of the surface 22 with a line to be measured.

A further slot 23 is formed in the base member 1 and extends perpendicular to the slot 19. The apparatus is provided with a scale carrier 24 having an elongated slot 26 formed therein. A shaft 27 of a thumb screw 28 passes through the slot 26 and the slot 23 and engages a plate 29 (see FIGURE 4). By loosening the thumb screw 28, the scale carriage 24 may be rotated about the shaft 27 or may be translated along the slot 23 or translated along the slot 26. Thus, the scale carriage is provided with freedom of movement about the vertical axis of the shaft 27 and rectilinearly in a plane parrallel to the plane of the base member 1.

The scale carriage 24 would, of course, be adapted to the particular type of scale to be secured thereto. In the accompanying drawings, it has been assumed that a triangular scale, architect's or engineer's, would be employed, and as such, the scale carrier is provided with a 45° face 31 and two spring clips 32 and 33 having rolled ends 34 and 36 adapted to engage a groove 37 which is conventional in such types of scales. Thumb screws 38 and 39 are provided for releasing or tightening, as the case may be, the clamps 32 and 33 so that a scale may be applied to the device and then clamped in position. A scale 41 of the conventional architect's or engineer's type is illustrated as applied to the scale carriage 24 in FIGURES 1 and 2. Other types of scales may be employed as would be apparent to one skilled in the art. It will be noted that, when the scale 41 is arranged as indicated in FIGURE 1, one of the scale faces is vertical in the drawing and thus, may be readily seen through the prisms 12 and 13.

In use, for instance, in order to scale a line of a particular length to one of the scales of the devices 41, the slidable member 7 is positioned in one end of the line and the slidable member 8 is positioned at the other end of the line. It should be noted that, where it is stated that the members are positioned at one end or the other of the line, this indicates that the hairline 16, whose position is indicated by the adjacent surface of the member 18, is aligned with one or the other end of the line to be measured. The members 7 and 8 are now clamped in position by means of the thumb screws 9 and 11 and the thumb screw 28 is loosened so that the scale carriage 24 may be rotated and translated. The scale carriage is now positioned so that a zero indicia of the scale 41 is positioned opposite, for instance, the slidable member 7 and a suitable indicia at another location on the scale is positioned opposite the slidable member 8.

In aligning indicia on the scale 41 with the members 7 and 8, the user looks down through the prisms, for instance the prism 12, aligning the hairlines 14 and 16 with one another and with the desired indicia on the scale 41. This assures accurate alignment of the scale 41 with the slidable members 7 and 8. In determining what is a suitable indicia to set opposite the slidable member 8, one must bear in mind the total length of the scale in terms of its markings and the length of the line being measured relative to, for instance, the longest line in the drawing. As an example, if the line being scaled initially is 90 feet long and constitutes the longest line on the drawing, then one-eighth scale may be employed and the carriage is rotated until the "90" indicia on the scale is viewed through the prism 13 of the slidable member 8. The scale carriage 24 is now clamped in position by means of thumb screw 28.

Thereafter, in measuring most other lines on the drawing, the slidable member 7 may be left in the given position and will be positioned opposite, for instance, one end of the line. The slidable member 8 is then moved until it is positioned at the other end of the line and the scale reading may be read directly through the prism 13 of the member 8. Thus, once the carriage 24 has been set in the desired position, all further measurements may be read directly from the scale 41.

One difficulty arises in use of the instrument for measuring lines which are shorter than the shortest distance between the two hairlines 12, 13 on the members 7 and 8, respectively. It is quite obvious that, with the apparatus as thus far described, a line which is shorter than the distance between the hairlines 12 and 13 when the members 7 and 8 are abutting cannot be read under the circumstances illustrated. In order to overcome this difficulty, the slidable member 7 is provided with a plate 42 attached to the vertical surface thereof and extending towards the member 8. The length of the plate 42 is such that, when members 7 and 8 are abutting, see specifically FIGURE 5, the right edge of the plate 42 as viewed in FIGURE 5 is aligned with the hairline 13, or more specifically, with hairline 16 formed in the prism 13 associated with the member 8. The right edge of the plate 42 can now be seen through prism 13 and indicia on scale 41 may be aligned with the edge of the plate 42 and can be accurately read. Thus, the single prism 13 may be employed for reading the length of short lines.

If a line is longer than the distance between hairline 14 and the left edge of the prism 13 but too short to use both members 7 and 8 to make the measurement, the right edge of plate 42 and the hairlines 15 may be employed.

It will be noted that the plate 42 carries a foot portion 43 which extends to the edge of the slot 19 so that proper alignment between the right edge of plate 42 and the end of a line to be measured may be obtained. In this regard, the foot 43 is similar to the member 21 of plate 18.

As previously indicated, the apparatus of the present invention may be employed for scaling illustrated materials such as pictures and drawings when preparing printed publications. Normally, a picture will not be of the precise size required to fit into the space allocated thereto and, in the normal course of events, the picture is usually larger than the space allocated. The apparatus of the present invention may be employed to determine the percentage of reduction of the picture required. In order to determine the percentage of reduction required, the scale 41 will constitute a scale having 100 indicia thereon. The members 7 and 8 are spaced apart by a distance equal to the present size of the picture. The scale carriage 24 is rotated and translated until the 0 indicia is disposed opposite the member 7 and the 100 indicia is disposed opposite the member 8. The scale carriage 24 is then locked in position and the member 8 is moved to a position to indicate the width or height of the picture, as the case may be, as it is to appear in the printed publication. Then, by looking through the prism 13, the number read from the scale indicates the percentage change in the size of the picture, for instance, 65 indicating that a 35 percent reduction is required.

While I have described and illustrated one specific embodiment of my invention, it will be clear that variation of the details of construction which are specifically illustrated and described may be resorted to without departing from the true spirit and scope of the invention as defined in the appended claims.

What I claim is:

1. A scaling instrument comprising a base member having a first edge, a pair of slidable members attached to said base member for movement along a common axis parallel to said first edge of said base member, a scale carriage for supporting a scale thereon, means for attaching said scale carriage to said base member for rotation about an axis perpendicular to the plane of said base member, and means for independently aligning said slidable members with indicia formed on the scale supported on said scale carriage.

2. A scaling instrument comprising a base member having a first edge, a pair of slidable members attached to said base member for movement along a common axis parallel to said first edge of said base member, a scale carriage, means for attaching said scale carriage to said base member for rotation about an axis perpendicular to the plane of said base member and for linear movement in the plane of said base member perpendicular to said first edge, means for securing a scale to said scale carriage, and means for independently aligning said slidable members with indicia formed on a scale carried by said scale carriage.

3. A scaling instrument comprising a base member having a first edge, a pair of slidable members attached to said base member for movement along a common axis parallel to said first edge of said base member, a scale carriage, means for attaching said scale carriage to said base member for rotation about an axis perpendicular to the plane of said base member and for rectilinear movement in the plane of said base member, means for securing a scale to said scale carriage, and means for independently aligning said slidable members with indicia formed on a scale carried by said scale carriage.

4. A scaling instrument comprising a base member having a first edge, a pair of slidable members attached to said base member for movement along a common axis parallel to said first edge of said base member, a scale carriage for supporting a scale thereon, means for attaching said scale carriage to said base member for rotation about an axis perpendicular to the plane of said base member, each of said slidable members including a triangular prism having a first leg parallel to the plane of said first edge and facing said scale carriage and a second leg generally perpendicular to said first leg and parallel to the plane of said base member, each of said legs having a visible line formed thereon which can be aligned with one another and with indicia on the scale supported on said scale carriage when viewing through said second leg of said prism.

5. The combination according to claim 4 further comprising a plate extending from one of said slidable members in a direction towards the other of said slidable members, said plate being of a length such that the end thereof is aligned with said visible line formed on said first leg of said prism of the other of said slidable members when said slidable members are in contact with one another.

6. The combination according to claim 5 wherein said prism associated with said other slidable member extends across the entire surface of said slidable member parallel to said edge.

7. The combination according to claim 4 further comprising an elongated slot formed in said base member parallel to said first edge and lying between said slidable members and said scale carriage, said slidable members each having a member extending to the adjacent edge of said slot and having an edge surface aligned with said visible line on said first leg of said prism.

8. A scaling instrument comprising a base member having a first edge, a pair of members attached to said base member for movement relative to one another along an axis parallel to said first edge of said base member, a scale carriage for supporting a scale thereon, means for attaching said scale carriage to said base member for rotation about an axis perpendicular to the plane of said base member, each of said slidable members including a triangular prism having a first leg parallel to the plane of said first edge and facing said scale carriage and a second leg generally perpendicular to said first leg and parallel to the plane of said base member, each of said legs having a visible line formed thereon which can be aligned with one another and with indicia on the scale supported on said scale carriage when viewing through said second leg of said prism.

References Cited
UNITED STATES PATENTS

| | | | |
|---|---|---|---|
| 713,097 | 11/1902 | Heydrick | 33—107 X |
| 1,900,757 | 3/1933 | Corbett | 33—150 |
| 2,300,448 | 11/1942 | Ludwig | 33—150 X |

LEONARD FORMAN, *Primary Examiner.*

HARRY N. HAROIAN, *Examiner.*